(12) United States Patent
Johnson et al.

(10) Patent No.: US 6,542,985 B1
(45) Date of Patent: Apr. 1, 2003

(54) EVENT COUNTER

(75) Inventors: David C. Johnson, Roseville, MN (US); Douglas A. Fuller, Eagan, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/404,684

(22) Filed: Sep. 23, 1999

(51) Int. Cl.⁷ .......................... G06F 9/308; G06F 9/30; G06F 9/32

(52) U.S. Cl. .................. 712/217; 712/226; 712/245; 711/219; 710/29

(58) Field of Search .................. 714/35, 38, 39, 714/47, 244, 10; 709/319, 107, 224, 102; 713/502, 501; 712/227, 224, 228, 244, 217, 245, 223, 230, 243, 226, 231; 711/211, 217, 219; 710/262, 29, 117, 41, 124, 130, 131

(56) References Cited

U.S. PATENT DOCUMENTS

| | | | |
|---|---|---|---|
| 3,818,458 A | 6/1974 | Deese | 340/172.5 |
| 4,034,353 A | 7/1977 | Denny et al. | 364/200 |
| 4,166,290 A | 8/1979 | Furtman et al. | 364/200 |
| 4,231,106 A | 10/1980 | Heap et al. | 364/900 |
| 4,367,525 A | 1/1983 | Brown et al. | 364/200 |
| 4,458,309 A | 7/1984 | Wilder, Jr. | 364/200 |
| 4,521,849 A | 6/1985 | Wilder, Jr. | 364/200 |
| 4,590,550 A | 5/1986 | Eilert et al. | 364/200 |
| 4,623,984 A | 11/1986 | Yokokawa et al. | 364/900 |
| 4,654,848 A | 3/1987 | Noguchi | 371/20 |
| 4,821,178 A | 4/1989 | Levin et al. | 364/200 |
| 4,905,171 A | 2/1990 | Kiel et al. | 364/551.01 |
| 5,051,944 A | 9/1991 | Fetterolf et al. | 364/900 |
| 5,062,055 A | 10/1991 | Chinnaswamy et al. | 364/513 |
| 5,067,107 A | 11/1991 | Wade | 395/500 |
| 5,123,017 A | 6/1992 | Simpkins et al. | 371/15.1 |
| 5,193,179 A | 3/1993 | Laprade et al. | 395/575 |
| 5,210,862 A | 5/1993 | DeAngelis et al. | 395/575 |
| 5,245,638 A | 9/1993 | Gustafson | 395/575 |
| 5,276,809 A | 1/1994 | Chisvin et al. | 395/250 |
| 5,307,483 A | * 4/1994 | Knipfewr et al. | 714/10 |
| 5,485,574 A | * 1/1996 | Bolosky et al. | 714/35 |
| 5,577,259 A | 11/1996 | Alferness et al. | 395/800 |
| 5,581,482 A | 12/1996 | Wiedenman et al. | 364/551.01 |
| 5,796,972 A | 8/1998 | Johnson et al. | 395/384 |
| 5,867,699 A | 2/1999 | Kuslak et al. | 395/587 |

OTHER PUBLICATIONS

Literature from Hewlett Packer, "Logic Analyzers State and Timing Analysis Modules HP 16510B, 16511B", 4 pages.

J. Harden et al. "A Performance Monitor for the MSPARC Multicomputer", *IEEE*, 1992, pp. 724–729.

George Gray, "Getting Started in 1100/2200 Performance Monitoring", 1993, pp. 32–35 and 64.

* cited by examiner

Primary Examiner—Daniel H. Pan
(74) Attorney, Agent, or Firm—Charles A. Johnson; Mark T. Starr; Crompton, Seager & Tufte, LLC (57) ABSTRACT

A data processor is disclosed that executes a number of microcode instruction words. Each of the microcode instruction words has a bit field reserved to indicate which, if any, event counters are to be incremented. This enables the number of executions of a particular microcode instruction word to be counted. By simply changing the microcode bits in the bit fields of the microcode instruction words, the event counter can be programmed to count any number or pattern of microcode instruction word executions. In one embodiment, there is a one-to-one correspondence between each bit in the bit field and each event counter. In another system, the bits in the bit field are decoded to provide an address that selects selected event counters.

22 Claims, 9 Drawing Sheets

Fig. 1
PRIOR ART

PRIOR ART

EVENT COUNTER

RELATED APPLICATIONS

The present invention is related to commonly assigned U.S. Pat. No. 5,796,972, entitled METHOD AND APARATUS FOR PERFORMING MICROCODE PAGING DURING INSTRUCTION EXECUTION IN AN INSTRUCTION PROCESSOR, issued Aug. 18, 1998; and U.S. Pat. No. 5,577,259, entitled COOPERATIVE HARDWARE AND MICROCODE CONTROL SYSTEM FOR PIPELINED INSTRUCTION EXECUTION, issued Nov. 19, 1996, both of which are incorporated herein by reference.

FIELD OF THE INVENTION

The present invention generally relates to general-purpose digital data processing systems, and more particularly relates to such systems that employ memories for storing microcode in an instruction processor. The present invention includes devices and methods for measuring performance of microcoded computer systems.

BACKGROUND OF THE INVENTION

The integration of modern computer systems has been facilitated by the rapid increase in density of modem integrated circuits and printed circuit boards. The integration of computer systems has a number of advantages, including increased performance, lower power, more reliability, and a reduced cost.

A difficulty with increased integration is that hardware changes may be difficult and/or expensive to correct, particularly during the design cycle of a computer system. Hardware errors may be found, including logic errors, timing errors or any other type of error that reduces the effectiveness of the computer system. These errors are typically found during design verification, but may be found much later, and even after the computer system is shipped to customers.

In the past, mechanical methods were used to make hardware corrections. These mechanical methods include providing jumper wires, re-fabricating a printed circuit board, interchanging an integrated circuit, etc. However, with the increased integration of computer systems, mechanical methods of correcting hardware errors are often not practical (i.e. expensive) or even not possible. A primary source of this difficulty is that the internal hardware is simply not accessible. For example, to correct a hardware error in an ASIC (Application Specific Integrated Circuit) within the design, it may be necessary to create a new set of masks, and re-fabricate the integrated circuit before further verification can continue. This not only can be expensive, but can have a long turn-around time. Likewise, and because many of today's printed circuit board are multi-layered, it may not always be possible to access a trace to correct a hardware error. Thus, is may be necessary to re-fabricate the printed circuit board before further verification can continue. This may also be relatively expensive and can have a long turn-around time.

For these and other reasons, most modern computer systems use micro-code to control the major data paths and control points within a computer system. This may allow a system designer to provide a work around for many of the errors that are detected by simply modifying the microcode. Thus, many of the hardware errors may be corrected, at least for further verification purposes, by changing the microcode. This may allow the verification process to continue, and the system designer may continue to identify other hardware errors in the design, if any.

After the verification process is completed, the system designer may correct the known hardware errors in a single pass. This may significantly reduce the design cycle time of modern day computer systems. In addition, in many cases only a few functions may be affected by a hardware error, and the work around microcode corrections may be sufficient until the next design revision of the computer system is released.

To implement the microcode control, typical computer systems include an instruction processor that may have an instruction cache, a decoder block, and a microcode RAM. Typically, an instruction is read from the instruction cache, and is decoded by the decoder. The decoder then provides a decoded address to the microcode RAM. A microcode instruction may include one microcode instruction word or be an extended instruction having several main code instruction words executed sequentially. The microcode RAM then provides a corresponding microcode instruction to the data processing system, including a number of control signals for controlling the major data paths and control points therein. External control signals are provided to the address decoding hardware to aid in selecting which microcode instruction should be executed. For example, different microcode instruction words may be executed based on the contents of cache, attempted security violations, and register flag values. The exact route taken through the microcode may vary depending upon external conditions and may vary from execution to execution for the exact same piece of machine code. It may never be known how often certain microcode instruction words are ever executed, or even if they are ever executed. It may be desirable to improve execution of certain microcode sequences by replacing or augmenting the microcode execution with dedicated hardware or specialized circuitry. By measuring the relative frequency of use of various microcode instructions, it may be possible to determine bottlenecks in execution that are likely candidates for hardware acceleration.

What would be desirable, therefore, is a system for counting the number of times selected microcode instructions and instruction words are executed, if they are executed at all. What would also be advantageous is a device for determining the relative number of times each of several microcode branches are taken for a complex instruction execution. What would also be desirable is a method for selecting certain microcode instructions and measuring the frequency that the selected instructions are executed, to determine if optimizing or accelerating execution of these instructions is warranted.

SUMMARY OF THE INVENTION

The present invention is preferably used in computer systems having machine code instruction executed through microcode. An illustrative system suitable for use with the present invention includes a machine code register for holding a machine code instruction coupled to a second machine code register for extracting or stripping out the data needed to identify the associated microcode. In one embodiment, the machine code operator portion is extracted along with any needed operand type information to further distinguish the type of operator. The operator data is used as an address into an ID translation table typically implemented in RAM. The ID translation table serves to provide an address into a microcode instruction word table, which stores the actual starting microcode instruction word to be executed. The address into the microcode instruction word table can be passed first to an address generator which can either pass the microcode instruction address through or provide an alternate address, discussed below. Given the address into the microcode instruction word table, one microcode instruction word can be extracted into a microcode instruction word register, which in turn can be feed into a microcode controller for generating the multiplicity of control signals required to execute the instruction.

The present invention preferably includes the use of a bit field in the microcode instruction word and microcode instruction word register, which can have a length sufficient for the purpose of the present invention. The bit field includes an event counter selection field for selecting which, if any, event counter is to be incremented when a corresponding bit is set. The invention includes one or more event counters to count the execution of microcode instruction words having the proper bit set.

In one illustrative system, one bit is used to designate one event counter, such that the number of event counters can be equal to the number of bits in the event counter bit field, and such that more than one bit can be set and counted in different event counters in the same execution. In another system, the number of event counter selection bits is less than the number of event counters, with the bit field being used to encode the number or address of the event counter to be incremented. For example, the bit field may be interpreted as a base two number used to calculate the address of the event counter. Similarly, the event counter bit field may be three bits long and is read by a 3-to-8 decoder to select one of seven event counters to increment, with a zero value meaning no event counters are to be incremented. To add flexibility to the system, the maintenance processor may be connected to the microcode word instruction RAM for downloading modified microcode instruction words, having different bits set in the bit field allowing different microcode instruction words to be counted.

In use, an existing production instruction processor board or boards can be replaced with specialized instruction processor board or boards including the present invention. The specialized board can include a longer microcode instruction word length in both the microcode RAM table and in the microcode instruction register. As indicated above, the microcode instruction words may be downloaded through the maintenance processor into the microcode instruction RAM. Event counter bits are preferably set in those microcode instruction words for which counting is desired. Microcode instructions can be grouped together and given identical event counter bit field values for some applications. With the microcode instruction words loaded into RAM, computer programs can be run to force the microcode to execute. Maintenance hardware can then be used to copy the values of all event counters into a set of event counter save registers in the same single clock pulse, as a snapshot of system performance. This can allow for accurate comparison between the event counter values. The values of the event counters stored in the save registers can be read out serially, over several clock pulses and analyzed.

Accordingly, the present invention can be used in analyzing the number of executions of microcode instruction words where the number or occurrence of even one execution of certain microcode instruction words cannot be determined a priori from examination of machine code source alone. In one example, machine code leads to an initial location in the microcode RAM table which can be branched, depending on the values of external control signals which cannot be known at compile time or load time of the program. Examples of external signals include the presence of an operand in cache or even in memory, the value of arithmetic flags set by a previous operation, the value of security and privilege flags depending on the user and the state of the machine, etc. The branches that are actually taken through the microcode can be counted by inserting event counter bits in the event counter fields of various microcode instruction words and counting how often, if ever, certain microcode instruction words are executed. In another example, some microcode instructions are extended instructions in which one instruction word contains the address of the next microcode instruction word, where the next address can be conditionally chained, depending on the value of the external signals.

The present invention can thus be used to determine the relative frequency of microcode instruction word execution. Instructions that are frequently executed may be selected for optimization or hardware acceleration. Further, specialized instructions that are found to rarely or never be executed during days of testing under conditions at a user site may be removed and/or the support hardware supporting these instructions may be removed from subsequent systems.

DETAILED DESCRIPTION OF THE INVENTION

Figure 1:
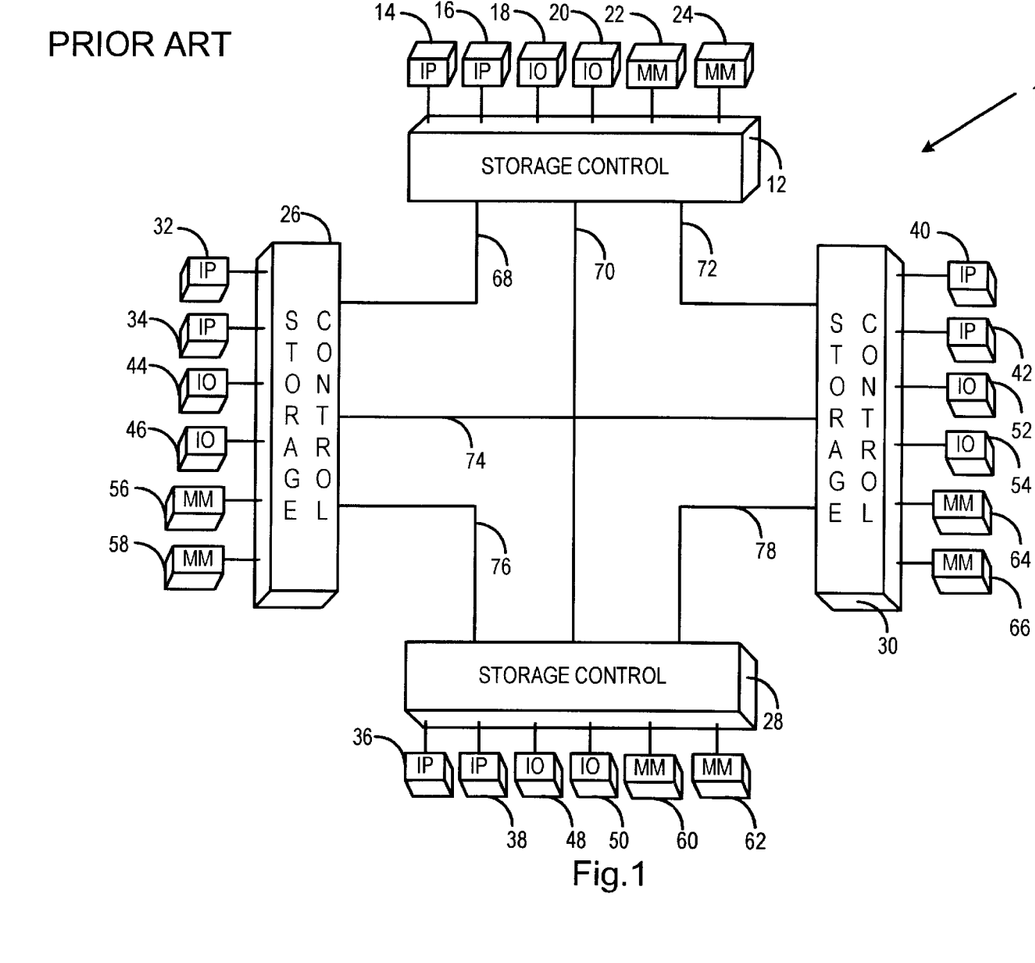
FIG. 1 is a schematic diagram of a fully populated data processing system incorporating the present invention.

FIGS. 1–6 illustrate a data processing system which can include the present invention. FIG. 1 is an overall diagram of fully populated data processing system 10 which includes four individual processing clusters, each having its own storage controller and each having point-to-point communication with the other clusters via a storage controller-to-storage controller interface.

Storage controller 12 is coupled to storage controller 26 via interface 68. Similarly, storage controller 12 is coupled to storage controller 28 via interface 70 and to storage controller 30 via interface 72. Storage controller 26 communicates with storage controller 28 via interface 76 and to storage controller 30 via interface 74. In similar fashion, storage controller 28 and storage controller 30 are coupled via interface 78.

Storage controller 12 is fully populated with instruction processor 14, instruction processor 16, input/output processor 18, input/output processor 20, main memory module 22 and main memory module 24. Each of instruction processors 14 and 16 (along with similar instruction processors 32, 34, 36, 38, 40, and 42) has internal dedicated cache resources in the form of an instruction cache and an operand cache. These elements, along with the associated data invalidity logic, are described in more detail below. A more general description of the construction and operation of instruction processors 14 and 16 may be found in the above-referenced and commonly assigned U.S. patents which have been incorporated by reference.

Input/output processors 18 and 20, along with main memory modules 22 and 24, may be elements currently available, such as found in the Unisys Model 2200/600 series. Input/output processors 44, 46, 48, 50, 52 and 54 and main memory modules 56, 58, 60, 62, 64 and 66 may be similarly found.

Figure 2:
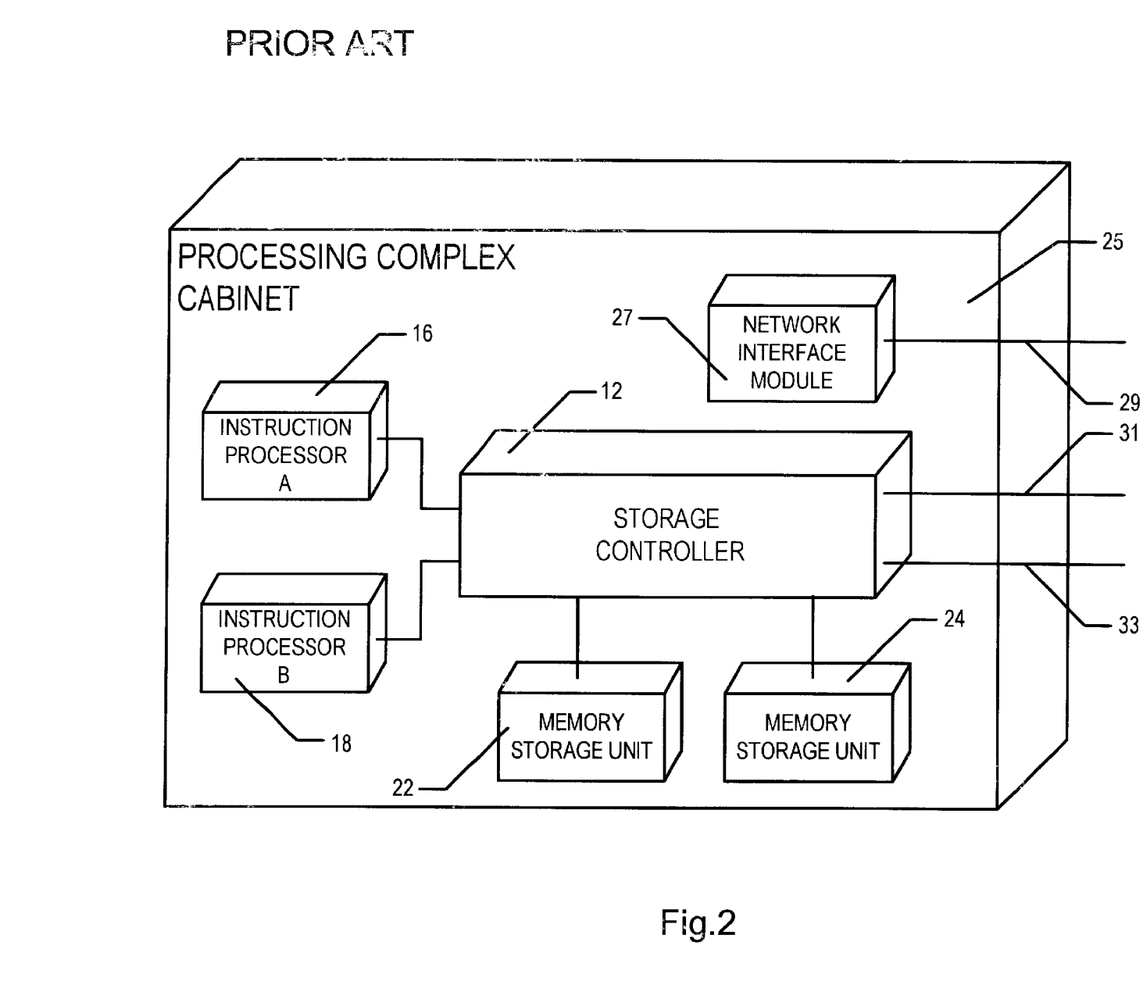
FIG. 2 is a pictorial diagram showing the packaging arrangement of the data processing system of FIG. 1.

FIG. 2 is a schematic diagram showing the packaging of a portion of data processing system 10. A major physical element of data processing system 10 is Processing Complex Cabinet, PCC 25. Within fully populated PCC 25 is located instruction processors 16 and 18 (i.e., IPA and IPB). In the preferred mode, each of these instruction processors is packaged on a single high density circuit board. The memory storage units 22 and 24 are coupled to storage controller 12 as explained above.

Network interface module (i.e., NIM) 27 provides an interface to the operator console via cable 29. Cables 31 and 33 couple input/output units 18 and 20 (see also, FIG. 1) to storage controller 12. Input/output units 18 and 20 are physically packaged in an Input/output Complex Cabinet (i.e., ICC) which is not shown for clarity. Other referenced elements are as previously described.

Figure 3:
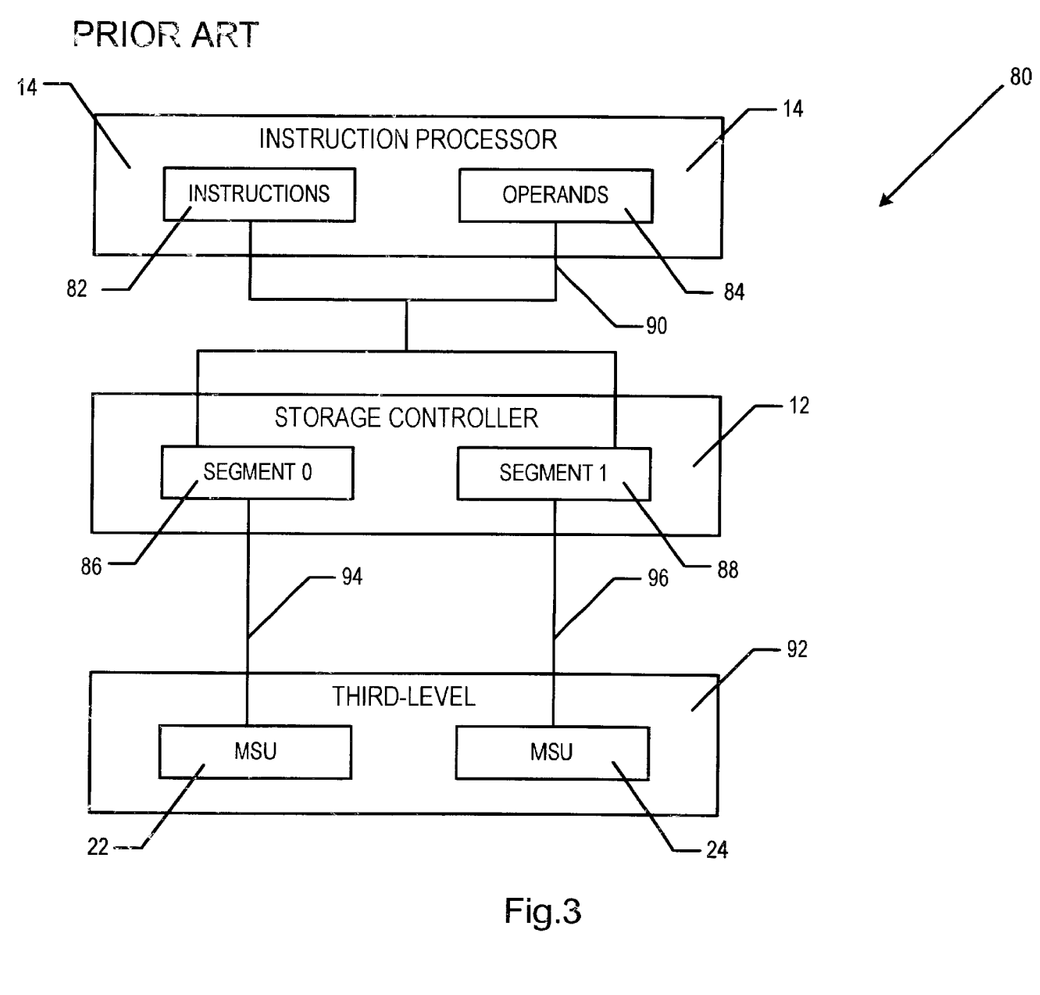
FIG. 3 is a schematic diagram of the levels of storage for a single instruction processor.

FIG. 3 is a flow diagram 80 showing the hierarchical arrangement of the three levels of storage within data processing system 10. Instruction processor 14 contains an instruction cache 82 and an operand cache 84, each storing 8k of 36-bit words. These are internal to instruction processor 14 and dedicated to the operations undertaken therein. By partitioning the internal dedicated cache resources in this manner, there is a certain concurrence of cache accesses associated with normal instruction execution.

Upon the request of instruction processor 14 to access a particular data element as either an instruction or operand, the directory of instruction cache 82 or operand cache 84, respectively, is queried to determine if the required data element is present within the associated cache resource. If the data element is present and valid, the access is completed at that level. If not, access is made to storage controller 12 via interface 90 for the block of eight 36-bit words containing the desired data element. A more detailed explanation of the operation of instruction cache 82 and operand cache 84 is found below.

Storage controller 12 contains an intermediate level cache segment of 128k 36-bit words for each main memory module within the cluster. In the present illustration, storage controller 12 contains segment 0 cache 86, and segment 1 cache 88. These cache resources are shared by all users of the main memory within the cluster to include both local and remote users. Any memory request to storage controller 12 is routed to the appropriate directory of segment 0 cache 86 or segment 1 cache 88 to determine if the desired data element is present and valid. This routing is based upon the address requested, since the intermediate cache resources are partitioned in address space to correspond to the associated main memory module.

If present and valid, the requested data element is supplied as an eight-word block. If the requested data element is not validly present in segment 0 cache 86 or segment 1 cache 88 (depending upon the requested address), the data is requested from third level storage 92 containing main memory modules 22 and 24 via interfaces 94 and 96, respectively. In the preferred mode, main memory modules 22 and 24 each contain 64 meg. words of storage.

Each data element request to storage controller 12 is made through a separate interface. For a fully populated system, this includes two instruction processors, two input/output processors, and three other storage controllers (see also, FIG. 1). Each data element request is divided between segment 0 cache 86 and segment 1 cache 88 based upon requested address. Only if the requested data element is not validly present in the appropriate intermediate level cache resource is an access request made to third level 92.

Figure 4:
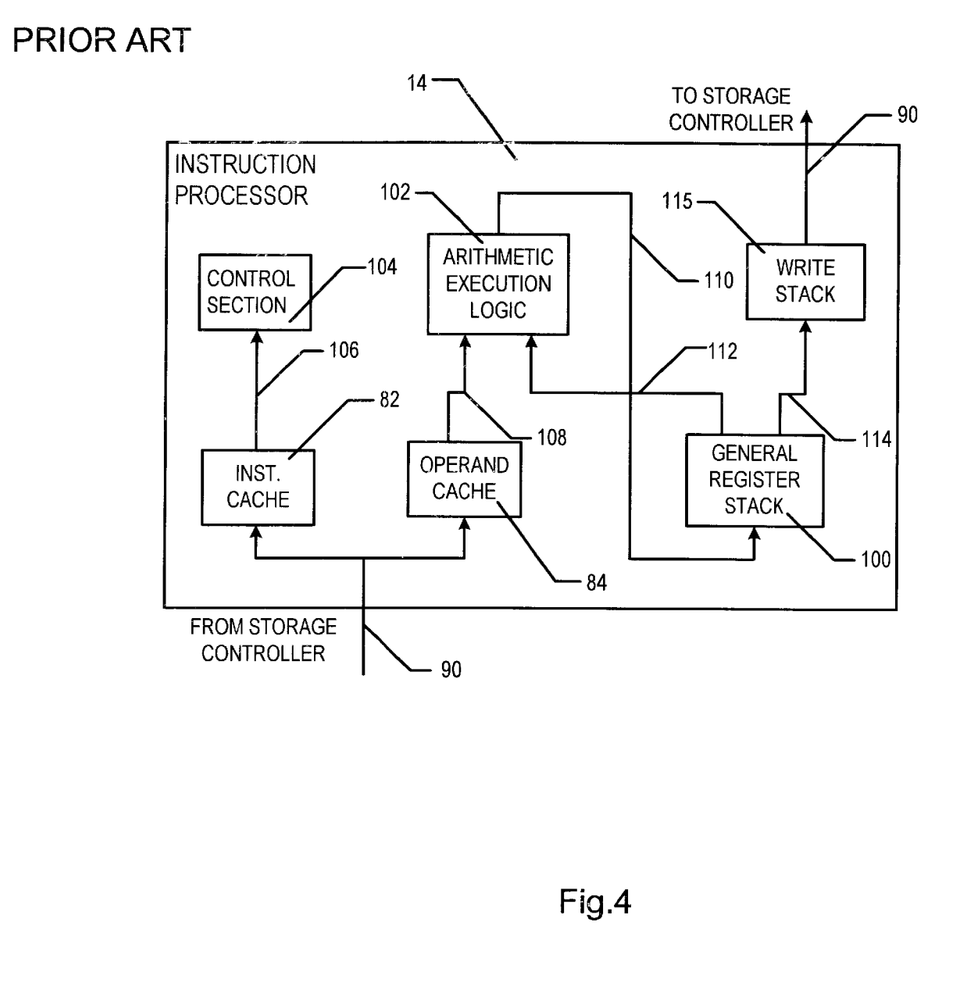
FIG. 4 is a simplified block diagram showing the major elements of the instruction processor.

FIG. 4 is a simplified block diagram of instruction processor 14 showing the major data and control paths. Cable 90, providing the data transfer path between storage controller 12 and instruction processor 14, is actually a two-way path. Data is accessed by storage controller 12 and routed to either instruction cache 82 or operand cache 84 depending upon whether the initial request was for instruction data or operand data. In accordance with usual local cache operation, instruction cache 82 and operand cache 84 temporarily store the data for use by instruction processor 14. Cable 90 also couples write data from write stack 115 to storage controller 12 for longer term storage. Priority for this shared interface is ordinarily given to read data requests requiring write data to be queued in write stack 115. The exception to giving priority to read data is whenever data is to be read from a location for which a write access has been queued.

Instructions from instruction cache 82 are provided via path 106 to control section 104 for decoding via microcode controller and hardwired control logic. Arithmetic execution logic 102 receives operand data via path 108 and performs the specified operation using a combination of microcode control and hardwired control as explained in greater detail below.

Most arithmetic instructions operate upon data which is temporarily stored in general register stack 100. This permits most rapid access to the data, because that data is directly accessed from an extremely fast storage stack. Similarly, arithmetic results are often returned to general register stack 100 for temporary storage until further arithmetic processing. Data is routed to general register stack 100 by path 110. Data from general register stack 100 is routed back to arithmetic execution logic 102 via path 112 and to write stack 115 via path 114. The data transferred to write stack 115 is queued for storage by storage controller 12 as discussed above.

Figure 5:
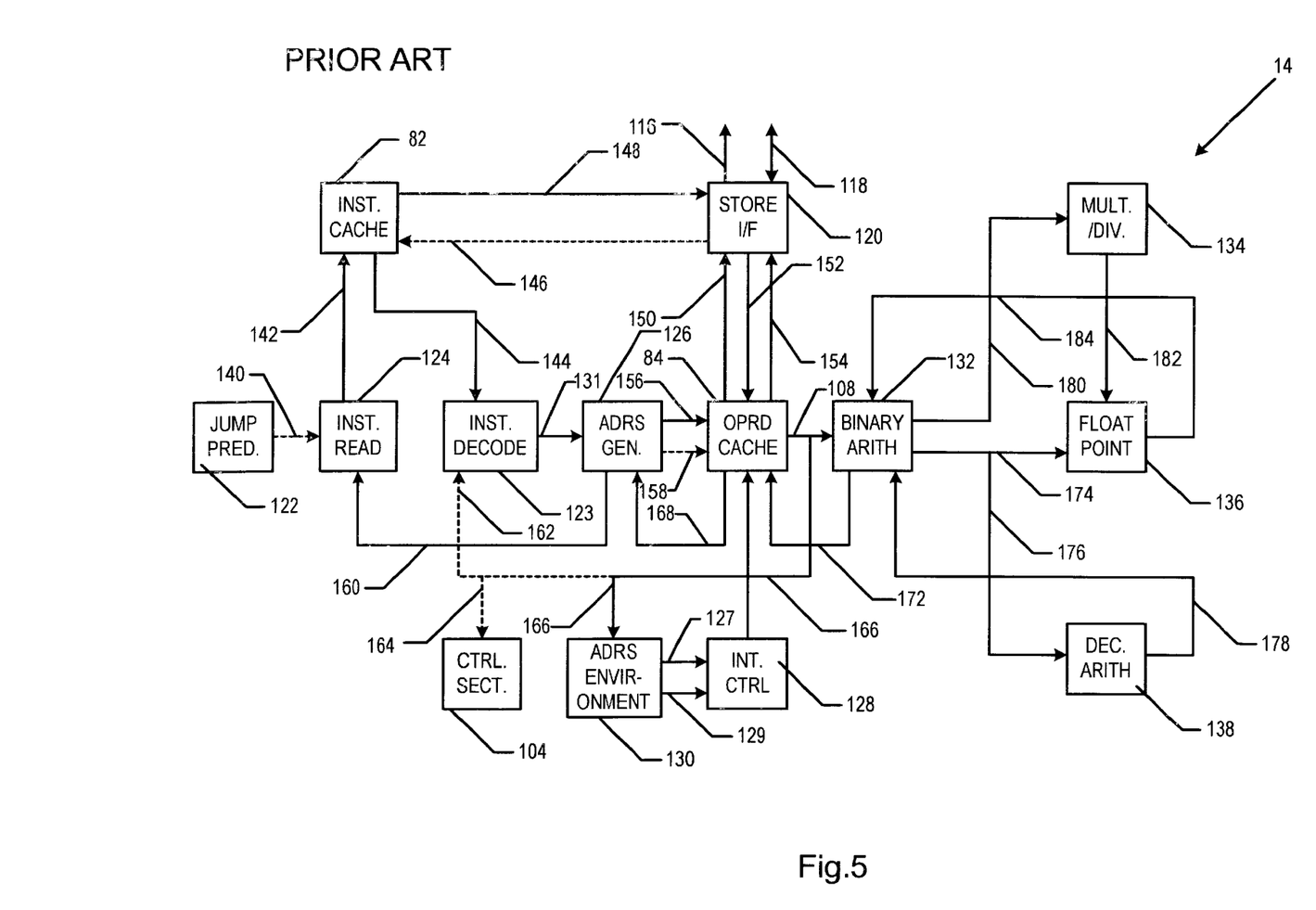
FIG. 5 is a detailed block diagram of the instruction processor.

FIG. 5 is a more detailed block diagram of instruction processor 14. The major data paths are shown, with the solid line paths signifying 72-bit, double-word transfer paths; the dashed line paths signifying addressing paths; and the dotted lines indicating data paths of no greater the 36 bits. Control line paths are not shown for clarity.

The interface to storage controller 12 is via cable 90, as described above. It consists of write cable 116 and read/write cable 118. Each of these data paths couples a 72-bit double word in parallel fashion. The function of write stack 115 (see also FIG. 4) is incorporated within store interface 120, which also provides the request/acknowledge synchronization logic. Addressing information for store interface 120 is sent from instruction cache 82 via cable 148 and operand cache 84 via cable 150 for a corresponding cache miss. Instructions are sent to instruction cache 82 via path 146. Because instructions are 36-bit words, path 146 has a width of 36 bits. Operand data read by storage controller 12 is transferred from store interface 120 to operand cache 84 by path 152. Similarly, write operand data is sent from operand cache 84 to store interface 120 via path 154. Both path 152 and path 154 have a width of 72 bits to accommodate double word operands.

Instructions to be executed are addressed by instruction read 124. The addresses are computed using one of the base registers located within address environment 130. If the instruction is the next sequential instruction, its address is determined by incrementing the program address counter. If the instruction to be executed is addressed by a branch or jump instruction, the address may be computed by address generator 126 and supplied via path 160. Alternatively, the address may be supplied by jump prediction 122 via path 140 during operation in the jump prediction mode as explained in detail below. The address of the next instruction is provided to instruction cache 82 via path 142.

The next addressed instruction is fetched from instruction cache 82 if a match is found. If the request results in a cache miss, storage controller 12 is requested to read the memory block containing the instruction as discussed above. In either case, the instruction is provided to instruction decoder 123 via path 144. The instruction is decoded through the use of a microcode controller by instruction decode 123, and the operand address is computed by address generator 126 from the data received via path 131.

Operand cache 84 contains general register stack 100 (see also, FIG. 4). The cache is addressed by the output of address generator 126 received from path 158. Direct operands are received on path 156. If a match is not made in operand cache 84, a read request is made of storage controller 12 through store interface 120, as explained above. If a match is found in operand cache 84, or if the instruction specifies a direct operand received on path 156, the operand data is more immediately produced. In either case, the operand data is routed in accordance with the operation to be performed as specified by the instruction. Indirect operands cause the new operand address to be transferred to address generator 126 via path 168. Operands are transferred to binary arithmetic 132 for mathematical computation via path 108 or to address environment 130 via path 166.

Binary arithmetic 132 provides the basic control for all arithmetic operations to be performed on data received via path 108. Floating point operations are scaled and controlled by floating point logic 136 which receives operand data on path 174. Floating point results are returned to binary arithmetic 132 by path 184. Mult./div. 134 performs the basic multiplication and division operations for fixed point instructions. Operand data is received via path 180 and the products/quotients returned via path 182 and floating point logic 136. Decimal arithmetic 138 receives operand data on path 176 and returns results via path 178. Decimal arithmetic performs special purpose decimal operations.

Another category of instructions involves a change to the base registers within the addressing environment 130. The data is supplied to addressing environment 130 via path 166.

Base register contents are supplied to interrupt control 128 via paths 127 and 129. Interrupt control 128 provides the interrupt data to operand cache 84 via path 170. Control section 104 provides the overall microcode control. The operation of instruction processor 14 is intended to occur in the pipelined mode whenever feasible. The preferred modes utilizes a three-stage pipeline.

Figure 6:
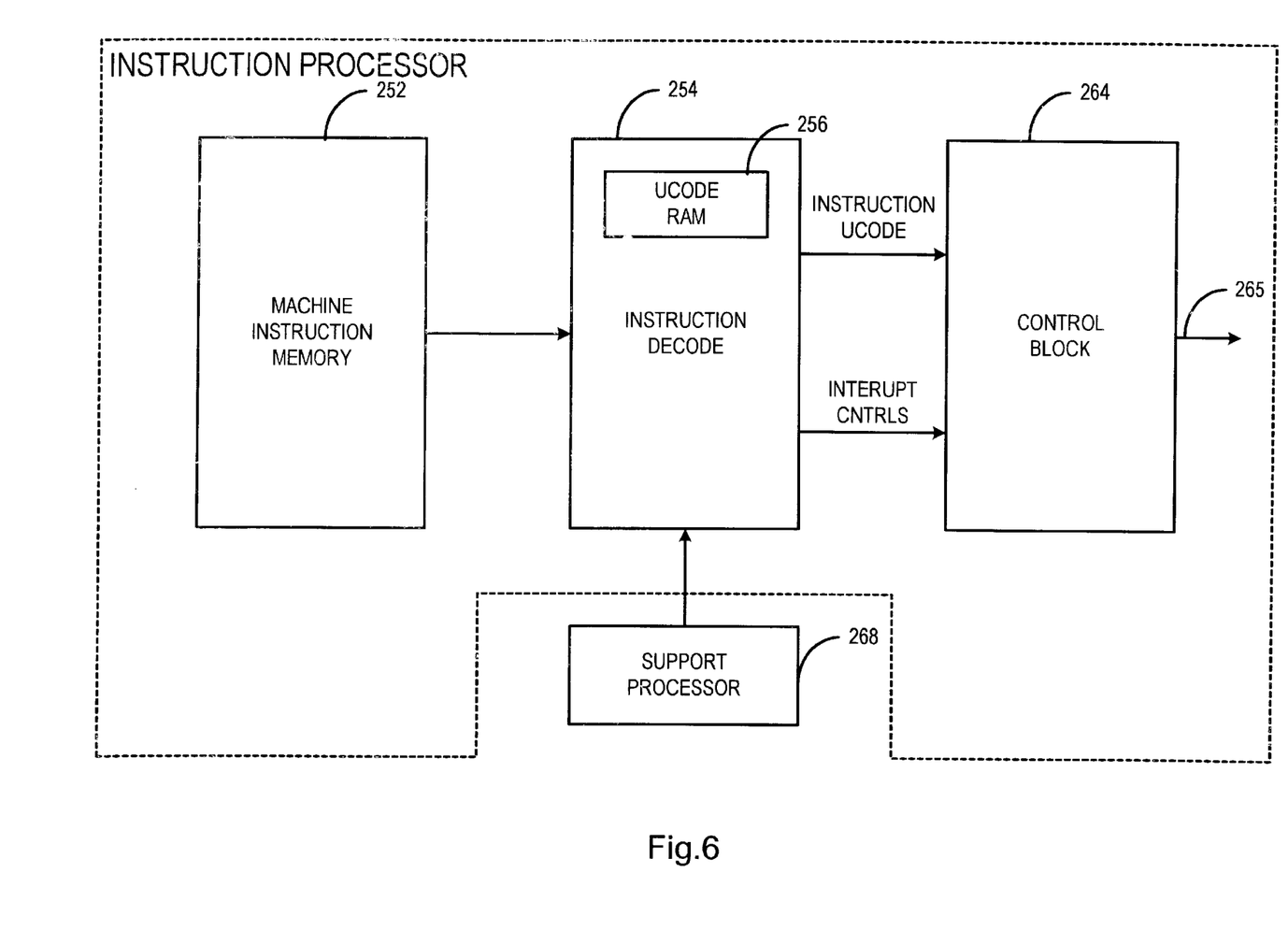
FIG. 6 is a block diagram showing a second illustrative instruction processor for executing instructions, wherein the instruction processor includes a microcode RAM.

FIG. 6 is a block diagram showing a second illustrative instruction processor 250 for executing instructions. The instruction processor 250 includes a machine instruction memory 252, an instruction decode block 254, and a control block 264. A support or maintenance processor 268 may be coupled to the processor 250 via, for example, NIM 27 of FIG. 2. The instruction decode block 254 is similar to instruction decode block 123 of FIG. 5, and includes a microcode RAM 256 as shown. The instruction memory 252 provides machine instructions to the instruction decode block 254 during instruction execution. In one embodiment, the machine instructions are Unisys 2200 machine instructions. The instruction decode block 254 then decodes each instruction, and provides a decoded instruction address to the microcode RAM 256. The microcode RAM 256 may store the current release of the microcode for the computer system. The microcode RAM 256 reads the corresponding address locations, and provides a corresponding microcode instruction.

The instruction decode block 254 provides the microcode instruction read from the microcode RAM 256 to the control block 264. Control block 264 may then provide control signals 265 to control the major data paths and control points throughout the data processing system.

Figure 7A:
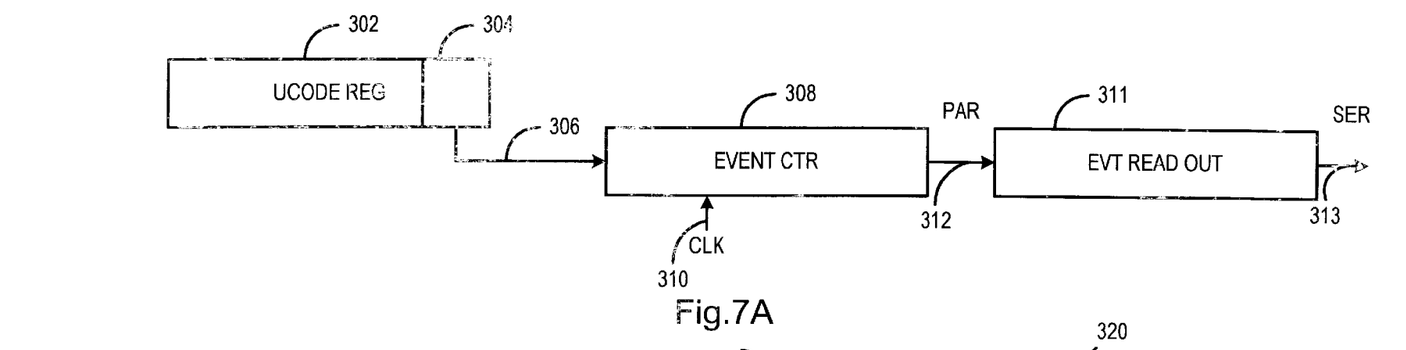
FIG. 7A is a block diagram showing a microcode event counter utilizing a single bit indicating whether execution of the microcode word should be counted.
Figure 7B:
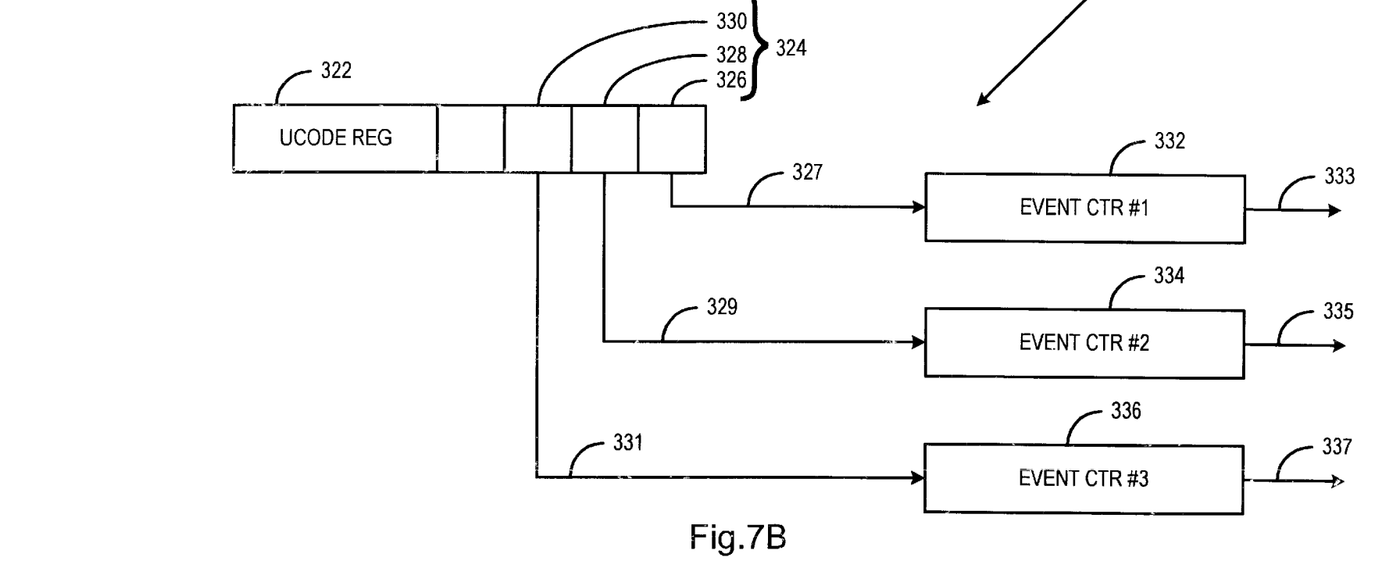
FIG. 7B is a block diagram showing a microcode event counter utilizing three bits indicating which, if any, of three event counters should be incremented.
Figure 7C:
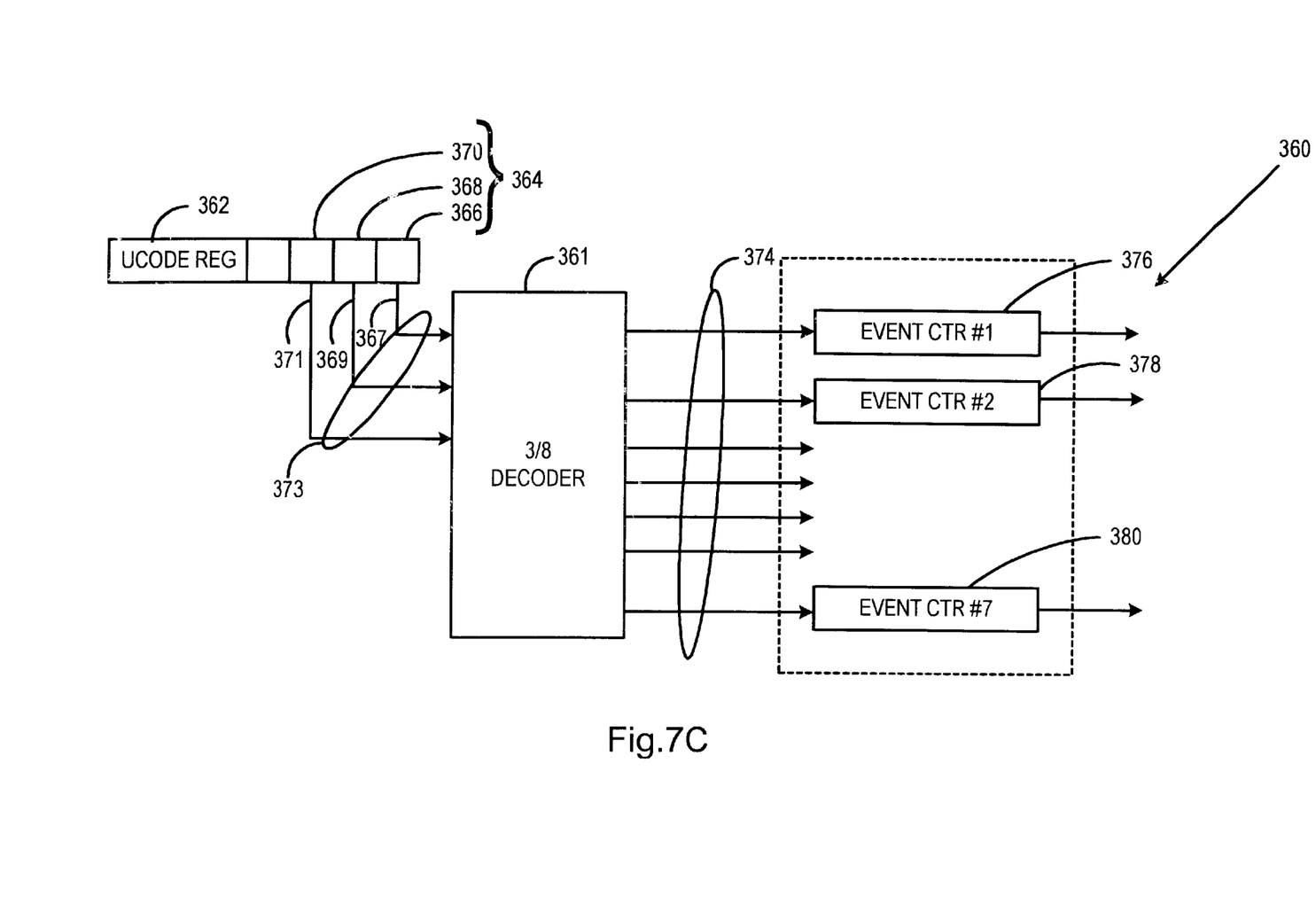
FIG. 7C is a block diagram showing a microcode event counter utilizing three bits encoding which one, if any, of seven event counters should be incremented.

Referring now to FIGS. 7A, 7B, and 7C, a simple block diagram of one aspect of the invention is illustrated, in particular, the bit representations and hardware for counting the execution of a single microcode instruction or class of instructions is illustrated. In FIG. 7A, a microcode instruction register 302 is illustrated, having a bit field 304 with only one bit. The bit field 304 is used to indicate that a counter is to be incremented when a microcode instruction having this bit set is found in microcode instruction register 302. The value of bit field 304 is transferred via path 306 to a counter or event counter 308 which can increment given the presence of a non-zero bit value in the bit field and the presence of a clock signal from clock signal source 310. In a preferred embodiment, a "1" value signifies that the associated counter is to be incremented and a "0" value signifies that the counter is not to be incremented. The embodiment of FIG. 7A can be used where even one bit is unused in the microcode word and a counter and the associated connecting hardware is provided.

In use, when the counting of a particular microcode instruction is desired, specialized microcode can be loaded into the microcode RAM, with selected bit or bits set in the corresponding bit fields. The specialized microcode instructions are not normally loaded on the fly during normal execution, but rather loaded after a shutdown of normal processing. In a preferred embodiment, only the microcode instruction words are changed, but not the address of the microcode instruction words within the microcode RAM. For example, the same microcode address is used as before, and a similar long microcode instruction word is retrieved from RAM, but having one or more bits set that were not previously set and were not likely even present, as the microcode instruction word can be longer than before. In one method, several microcode instruction words are identically marked with the same identifier, such that the execution of all of these microcode instruction words are counted.

This can be used to identify and count the execution of a group of similarly tagged microcode instructions. This can be useful where the grouping of microcode instructions are not readily apparent from an extended instruction set or other logical layout.

The contents of counter 308 are not immediately readable in most embodiments, but rather are read out at an appropriate time through an output path 312. In a preferred embodiment, path 312 is implemented as a parallel readout path capable of reading out the contents of counter 308 in a single clock cycle. The readout may or may not be destructive, clearing out the register contents after the read. Reading the contents of the event counter and any other event counter in a single clock cycle allows a snapshot of the event counter values to be taken for comparison and analysis. Path 312 can transfer the contents of the event counter into an event read out register 311 which can, for example, be implemented as a shift register which can be serially read by the maintenance processor 268 via path 313. It is comtemplated that the event counter 308 can be cleared, such as by the support processor, without effecting the operation of the system. This allows the event counter 308 to sample various job mixes or user activity at various times of the day. The examples of FIGS. 7B and 7C also may have parallel and serial read outs, which are not illustrated to simplify the drawings.

FIG. 7B illustrates an event counter embodiment 320 having a microcode register 322 with a bit field 324 including a first bit 326, a second bit 328, and a third bit 330. First bit 326 is connected via path 327 to a counter 332, which is read via path 333. Second bit 328 is connected via path 329 to a counter 334, which is read via path 335. Third bit 330 is connected via path 331 to a counter 336, which is read via path 337. In event counter 320, three counters are addressable through the three bits dedicated in the microinstruction bit field. In this embodiment, bits can be set in parallel in more than one bit position. For example, the first bit may be set for all occurrences of an extended instruction having several sub-instructions possible. Bit two may set for only one sub-instruction, and bit three set only for another sub-instruction, allowing a count of both the total number of occurrences of the extended microinstruction and the number of that total that fall within certain subsets of the microinstruction. As indicated above, the event counters may be read as discussed above with respect to FIG. 7A.

FIG. 7C illustrates an event counter embodiment 360 having a 3-to-8 decoder 361, an encoded bit field 364, including a first bit 366 connected via a path 367 to decoder 361, a second bit 368 connected via a path 369 to decoder 361, and a third bit 370 connected via path 371 to decoder 361. Decoder 361 receives the three bits of bit field 364 and provides an address of the counter to be incremented. The value "000" can signify that no counter is to be incremented, and any bits being set can be used to address counters numbers 1 through 7 or 0 through 6 depending on the numbering conventions. FIG. 7C illustrates only counters number 1, 2 and 7 for clarity. Once the address of a counter has been determined, one of paths 374 can be used to increment first counter 376, second counter 378, up to a seventh counter 380. While three bits have been illustrated in FIG. 7C, any number of bits can be used to encode the counter address to be incremented. As indicated above, the event counters may be read as discussed above with respect to FIG. 7A.

Figure 8:
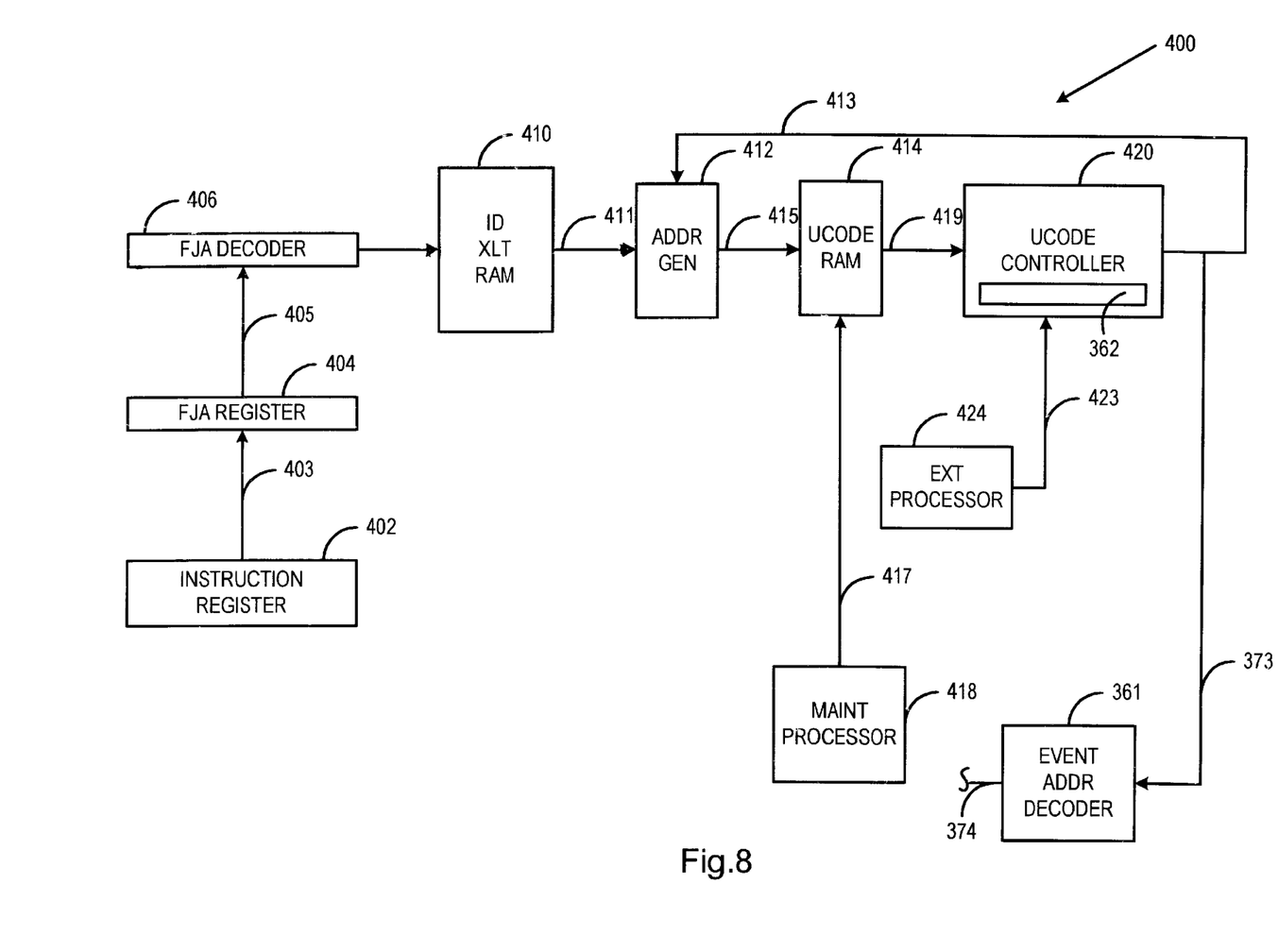
FIG. 8 is a block diagram showing an instruction processor including machine code to microcode decoding and showing the relationship to the event counter of FIG. 7C.

FIG. 8 illustrates a instruction decoder and microcode event counter system 400 for decoding a machine code instruction to a microcode instruction, and further counting the execution of selected microcode instructions. System 400 includes a machine code instruction cache register 402 coupled via path 403 to an FJA register 404 coupled in turn to a FJA decoder 406. The FJA register accepts only a portion of the machine code instruction, including the portion having the addressing information needed to locate the proper microcode. For example, some of the machine instruction may refer to direct operands and not effect the microcode address selection. The FJA decoder can decode the contents of the FJA register and generate an address into an ID TRANSLATION RAM 410 which generally has a single start address for a unique opcode or opcode/operand combination in the machine code instruction. The address generated from ID XLT RAM 410 passes to microcode address generator 412 via path 411 which, in a preferred embodiment, includes internal logic and an address/control line 413 as input to the address generator 412. The address/control line can serve to augment the input of the ID XLT RAM output such that taken together, the ID XLT RAM 410 and the address/control line 413 can generate the address into a microcode RAM table 414. The function of the address/control line 413 is further discussed below. Address generator 412 and microcode RAM 414 serve a function similar to instruction decode block 254 in FIG. 6.

Microcode RAM table 414 preferably is connected to a maintenance processor 418 via path 417. The maintenance equipment can be used to load specialized microcode into microcode RAM table 414. The specialized microcode instructions loaded into the microcode RAM can have a longer length than the normal microcode words, at least in part to handle extra encoding for the events counter addressing as discussed above.

A selected microcode instruction word is provided to a microcode controller 420 via path 419, which can include microcode register 362 discussed above with respect to FIG. 7C. Microcode controller 420 can generate a multiplicity of control signals to execute the function of the microcode. Microcode controller 420 receives external control signals 424 through a path 423. External control signals 424 can include information about the state of the processor, the state of the machine, the privileges of the user, etc. The external control signals may also be derived at least in part from the history of the processor. Examples of external signals that could be included as inputs to microcode controller 420 include register flags, security address limit violations, and indicators as to whether an operand is in cache or memory. Microcode controller 420 outputs address/control signals 413 to microcode address generator 412 for use in selecting the next microcode instruction.

External signals 424 are one example of why the execution path of the microcode can not be predetermined purely from the machine instruction sequence. For example, while the start address of the microcode may be determined from the machine instruction, there may be further branching or other processing depending on the type of operand, the location of the operand, or the state of arithmetic status flags set by the previous operation. Thus, the sequence of branches may not be known unless some sort of tracking is provided. For example, certain microcode instructions may be extended instructions, with one word of the instruction giving the address of the next microcode instruction to be executed, and whether the microcode instruction is to be chained or extended. While some microcode instructions are always multi-word instructions, others are conditionally multi-word, depending on the external signals 424. Thus there are some microcode instruction words that may be frequently executed or never executed, with the result being of possible interest to designers considering removing bottlenecks to performance and/or not improving those aspects of the machine which are rarely or never used.

An event counter address line 373 is shown extending from microcode controller 420 and being read by event counter address decoder or demultiplexer 361, further discussed above with respect to FIG. 7C. The remainder of the event counting hardware is preferably similar to that discussed above with respect to FIG. 7C.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. In a microcode instruction processor having a microcode instruction register for storing a microcode instruction, the microcode instruction coupled to a control unit, for counting the number of times the microcode instruction of said selected microcode instructions are executed in a computer, wherein the improvement comprises:

means for indicating whether to count execution of the microcode instruction of all said selected microcode instructions;

means for counting execution of the microcode instruction when said indicating means indicates that the microcode instruction is to be counted; and means for incrementing a counter each time a microcode instruction is executed that has a one bit field that indicates the corresponding microcode instruction should be counted.

2. In a microcode instruction processor as recited in claim 1, wherein said indicating means includes a bit field in said microcode instruction that indicates whether to count execution of said microcode instruction.

3. In a microcode instruction processor as recited in claim 2, wherein said bit field is a single bit and said counting means includes a single counter for counting said indicated microinstructions.

4. In a microcode instruction processor as recited in claim 2, wherein said bit field has more than one bit.

5. In a microcode instruction processor as recited in claim 4, wherein said counting means includes a number of microcode instruction counters equal in number to said number of bits in said bit field, such that each bit corresponds to one of the microcode instruction counters.

6. In a microcode instruction processor as recited in claim 4, wherein said counting means includes:

a number of microcode instruction counters that is greater than said number of bits in said bit field; and a microcode instruction counter decoder for receiving the number of bits and for providing a decode address of the bits to the number of microcode instruction counters.

7. In a microcode instruction processor as recited in claim 6, further comprising an address generator for receiving an input based at least in part on a machine instruction and for outputting an address into a microcode instruction storage device for providing the microcode instruction.

8. In a microcode instruction processor as recited in claim 7, wherein said address generator is addressable and receives an address, further comprising a translation table for receiving at least a portion of said machine instruction and for outputting said address to said address generator for generating an address into said microcode instruction storage device.

9. In a microcode instruction processor as recited in claim 8, further comprising a plurality of external signal paths operably coupled to the address generator, wherein the address generator output is based at least in part on said external signal values.

10. A system for counting the execution of selected microinstructions in a computer comprising:

an addressable memory device storing microcode instruction words having an event counter bit field with more than one bit for designating an event counter selection;

a microcode instruction word register for receiving an addressed microcode instruction word from said addressable memory device;

a decoder for decoding a portion of said microcode instruction word register corresponding to said event counter bit field and for outputting an event counter selection; and a plurality of event counters operably coupled to said decode, each of the plurality of event counters incrementing when selected by said event counter selection.

11. A system for counting selected microinstruction executions as recited in claim 10, further comprising:

a plurality of readout registers coupled to said event counters for reading said event counter values and storing said event counter values.

12. A system for counting selected microinstruction executions as recited in claim 11, further comprising a plurality of readout paths coupled to said readout registers for reading the values of said read out registers.

13. A system for counting the execution of selected microcode instruction words in a computer as recited in claim 12, wherein said decoder selects one event counter for each bit set in said bit field, such that more than one event counter can be incremented for each microcode instruction.

14. A system for counting the execution of selected microcode instruction words in a computer as recited in claim 12, wherein said decoder decodes said bit field as a base two number and selects at most one of said event counters based on said base two value.

15. A method for counting the number of times selected microcode instruction words are executed in a computer, the method comprising the steps of:

providing an instruction processor including:

at least one event counter for counting events, each of the at least one event counters having an input for incrementing said event counter and an output for reading said event counter contents; and a microcode instruction storage means for storing a number of microcode instructions, the microcode storage means having at least one bit field for each microcode instruction that indicates which if any of said at least one event counters are to be incremented when the corresponding microcode instruction is executed, said microcode instruction storage means being operably coupled to the inputs of said event counters;

setting bits in said microcode instruction storage means bit fields for those microcode instructions for which counting is desired;

executing selected microcode instructions;

sequentially providing the at least one bit field that corresponds to each executed microcode instruction the inputs of said event counters, causing those event counters that correspond to the set bits in the at least one bit field to increment; and reading out said event counter contents from said event counters.

16. A method as recited in claim 15, wherein said microcode instruction bit field contains a number of bit positions greater than one and have a one-to-one correspondence to said event counters, such that setting a bit in the bit field causes said corresponding event counter to be incremented when the corresponding microinstruction is executed.

17. A method as recited in claim 15, wherein there are more event counters than there are bits in the bit fields, the method further comprising the step of:

decoding the bits in the bit field into an address that selects one or more event counters and causes the selected event counters to increment.

18. A method as recited in claim 17, wherein the number of bits in each bit field is three, and the number of event counters is seven.

19. A method as recited in claim 17, wherein said bit fields are encoded as a base 2 number for selecting the selected event counters.

20. A method for counting the number of times selected microcode instructions are executed in a computer, the method comprising the steps of:

providing a bit field for each microcode instruction, wherein the bit field identifies whether the corresponding microcode instruction should be counted;

executing selected microcode instructions on the computer; and incrementing a counter each time a microcode instruction is executed that has a one bit field that indicates the corresponding microcode instruction should be counted.

21. A method for counting microcode instruction executions as recited in claim 20, wherein said bit field identifies at least one of a number of counters.

22. A method for counting microcode instruction executions as recited in claim 21, wherein said incrementing step increments all counters identified by the bit field.

* * * * *